(No Model.)

A. G. TURNER.
NUT LOCK.

No. 477,318.  Patented June 21, 1892.

WITNESSES:
H. F. Rohrer
L. M. Marble

INVENTOR
Alonzo G. Turner
BY E. M. Marble
ATTORNEY.

UNITED STATES PATENT OFFICE.

ALONZO G. TURNER, OF DURANGO, COLORADO, ASSIGNOR OF TWO-THIRDS TO FRANK A. KIMBALL, OF SAME PLACE, AND ALEXANDER LEVY, OF WALSENBURG, COLORADO.

NUT-LOCK.

SPECIFICATION forming part of Letters Patent No. 477,318, dated June 21, 1892.

Application filed March 8, 1892. Serial No. 424,216. (No model.)

*To all whom it may concern:*

Be it known that I, ALONZO G. TURNER, a citizen of the United States, residing at Durango, in the county of La Plata and State of Colorado, have invented certain new and useful Improvements in Nut-Locks; and I do hereby declare the following to be a full, clear, and exact description of the invention, such as will enable others skilled in the art to which it appertains to make and use the same.

My invention relates to nut-locks, and aims to produce a nut-lock which is simple in construction, easily adjusted in place, and positive in its action, rendering it impossible for the nuts to work loose from the bolt.

The invention is fully represented in the accompanying drawings, forming a part of this specification, in which like letters and numerals indicate like parts.

Figure 1:
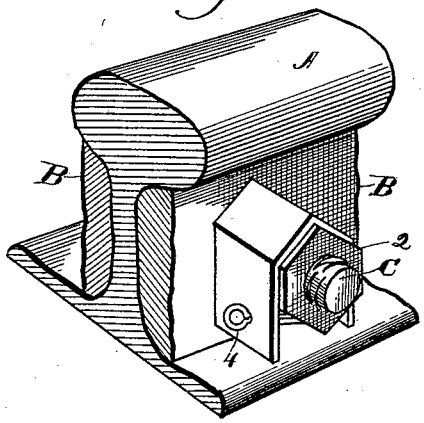
Figure 2:
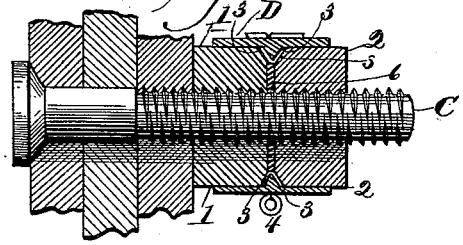
Figure 3:
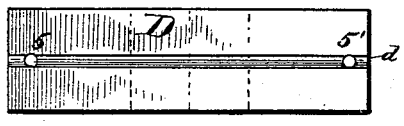
Figure 4:
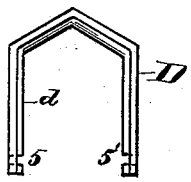

Figure 1 represents my device in perspective when applied to lock the nuts on a bolt which secures fish-plates to a rail. Fig. 2 is a cross-section through the rail, the bolt being shown in elevation. Fig. 3 is a blank, showing the construction of shield or clasp before being bent to fit the nuts. Fig. 4 is an end view of the shield or clasp.

In the drawings, A represents a rail. B represents fish-plates bolted to the rail by the bolt C. This bolt is provided on the end that projects from the fish-plates with a double screw-thread, on which are screwed two oppositely-threaded nuts 1 and 2. On the sides of these nuts, which approach each other, they are provided with projecting portions 3, which prevent the nuts from coming in close contact with each other and leave a V-shaped depression between them. To make certain the accomplishment of this object, (having a space between the two nuts,) I further provide a washer 6, which is inserted between the two nuts and aids to separate them from each other. A shield or hood D fits over the nuts, and has extending sides, in which are apertures 5 and 5', through which a headed or loop pin 4 is passed and turned down and clinched at the other end, thus holding the shield in position. The pin fits into the V-shaped depression between the nuts, and thereby prevents the shield or hood from being removed. On the inner surface of the shield is a rib $d$, (best shown in Fig. 3,) which fits into the V-shaped depression left between the nuts and prevents any lateral motion of the jacket.

Having thus fully described my invention, what I claim as new is—

1. In a nut-lock, the combination, with a bolt having a double screw-thread, two oppositely-threaded nuts provided on their adjacent faces with projecting portions to form a depression between them, and a washer inserted between the two nuts, of a shield or hood provided on its inner surface with a rib to fit into the depression between the nuts, provided also with apertures, and a pin to pass through the apertures in the shield and through the depression between the nuts and hold said shield in place, substantially as described.

2. As an article of manufacture, a nut-lock consisting of a double-threaded bolt C, nuts or burrs 1 and 2, having projecting portions on their adjacent faces to form a depression between the same, a washer 6, of any suitable material, between said nuts, a shield or hood D, provided on its interior with a longitudinal rib fitting over said nuts in the depression between them, and apertures for the reception of a locking-pin 4 to secure the hood in place, substantially as described.

In testimony whereof I affix my signature in presence of two witnesses.

ALONZO G. TURNER.

Witnesses:
HARRY Y. DAVIS,
L. M. MARBLE.